US011607994B2

(12) United States Patent
Wang

(10) Patent No.: US 11,607,994 B2
(45) Date of Patent: Mar. 21, 2023

(54) VEHICLE, OBJECT WARNING APPARATUS AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/504,727

(22) Filed: Oct. 19, 2021

(65) Prior Publication Data

US 2022/0118906 A1   Apr. 21, 2022

(30) Foreign Application Priority Data

Oct. 20, 2020   (CN) .......................... 202011124094.5

(51) Int. Cl.
*B60Q 9/00* (2006.01)
*G08G 1/16* (2006.01)

(52) U.S. Cl.
CPC ............... *B60Q 9/008* (2013.01); *G08G 1/16* (2013.01)

(58) Field of Classification Search
CPC .......... B60Q 9/008; G08G 1/16; G08G 1/165; G08G 1/166; B60W 30/09; B60W 30/0956; B60W 50/14; B60W 60/0015; B60W 60/0027; B60W 60/00276; B60W 2050/143; B60W 2555/60

See application file for complete search history.

(56) References Cited

U.S. PATENT DOCUMENTS

| 2019/0206254 A1 | 7/2019 | Tao et al. |
| 2019/0325754 A1 | 10/2019 | Aoude et al. |
| 2020/0074847 A1 | 3/2020 | Wang |

FOREIGN PATENT DOCUMENTS

| JP | 2020135674 A | 8/2020 |
| WO | WO-2017136627 A1 * | 8/2017 |

OTHER PUBLICATIONS

Feb. 22, 2022 European Search Report issued in corresponding International Application No. 21203615.

* cited by examiner

*Primary Examiner* — Daryl C Pope
(74) *Attorney, Agent, or Firm* — Clements Bernard Walker; Christopher L. Bernard

(57) ABSTRACT

An object warning apparatus for a vehicle including an acquiring module acquiring object information on objects surrounding the vehicle and traffic rule information including traffic rules associated with locations of the vehicle and the objects; a processing module determining (1) whether an object currently violates any one of the traffic rules; (2) whether the object will violate any one of the traffic rules when the vehicle passes the object; and (3) whether the object potentially endangers the vehicle, and to generate an appropriate warning instruction; and an outputting module outputting the warning instruction to a HMI of the vehicle to trigger the HMI so that the HMI warns a human driver of the presence of the object, or to an AD control unit of the vehicle so that the AD control unit executes appropriate automatic driving manipulations.

14 Claims, 4 Drawing Sheets

VEHICLE, OBJECT WARNING APPARATUS AND METHOD

CROSS-REFERENCE TO RELATED APPLICATION

The present disclosure claims the benefit of priority of co-pending Chinese Patent Application No. CN 202011124094.5, filed on Oct. 20, 2020, and entitled "OBJECT WARNING APPARATUS, SYSTEM AND METHOD FOR VEHICLE," the contents of which are incorporated in full by reference herein.

TECHNICAL FIELD

The present disclosure relates to the technical field of vehicle driving assistance, in particular to an object warning apparatus and method.

BACKGROUND

Driver assistance systems may enable a driver to gain insight and understanding in the surrounding conditions of a vehicle, thereby helping the driver recognize dangerous driving conditions. In the prior art, a driver assistance system is usually configured to detect objects surrounding a vehicle, and to inform a driver about the detected objects so as to help the driver understand a situation regarding the objects surrounding the vehicle.

As a driver assistance system includes more and more types of associated sensors and the interconnection between a vehicle and a roadside device or a cloud sever is increasingly being developed, object information from the associated sensors, the roadside device and the cloud sever that may be obtained by the vehicle is dramatically increasing. If all the acquired object information is provided to the driver, he or she would be confused by such a massive amount of object information.

Thus, driver assistance solutions found in the prior art have the disadvantage that a driver may not be able to distinguish which objects are dangerous and which objects are not based on the massive amount of object information in a short time. Especially in traffic scenes such as highways and intersections that require a driver to respond quickly to potentially dangerous objects, the driver's attention may be distracted by non-emergency object information, while ignoring emergency object information that requires the driver to respond quickly, thereby resulting in a traffic accident.

SUMMARY

In view of the above problems in the prior art, the present disclosure provides in one aspect an object warning apparatus for a vehicle including: an acquiring module configured to acquire object information on one or more objects surrounding the vehicle and traffic rule information including one or more traffic rules associated with locations of the vehicle and the one or more objects; a processing module configured to determine, based on the object information and the traffic rule information, (1) whether any object currently violates any traffic rule; (2) whether any object will violate any traffic rule when the vehicle passes the object; and (3) whether the object would endanger the vehicle passing by the object, and to generate a warning instruction if at least one of the determinations is affirmative; and an outputting module configured to output the warning instruction to a human-machine interface (HMI) of the vehicle to trigger the HMI to warn a human driver of the presence of the object, or to an automatic driving (AD) control unit of the vehicle so that the AD control unit executes automatic driving manipulations based on the warning instruction.

The present disclosure provides in another aspect a vehicle including an object warning apparatus, an HMI and an AD control unit, the object warning apparatus including an acquiring module configured to acquire object information on one or more objects surrounding the vehicle and traffic rule information including one or more traffic rules associated with locations of the vehicle and the objects; a processing module configured to determine, based on the object information and the traffic rule information, (1) whether any object currently violates any traffic rule; (2) whether any object will violate any traffic rule when the vehicle passes the object; (3) whether the object would endanger the vehicle passing by the object, and to generate a warning instruction if at least one of the determinations is affirmative; and an outputting module configured to output the warning instruction, the HMI in communication with the object warning apparatus; the AD control unit in communication with the vehicle warning apparatus, wherein, if the vehicle is in an automatic driving mode, the object warning apparatus is configured to output the warning instruction to the AD control unit such that the AD control unit executes AD manipulations according to the warning instruction; and wherein, if the vehicle is driven by a human driver, the object warning apparatus is configured to output the warning instruction to the HMI such that the HMI warns the human driver of the presence of the object.

The present disclosure provides in yet another aspect an object warning method for a vehicle including: acquiring object information on one or more objects surrounding the vehicle and traffic rule information including one or more traffic rules associated with locations of the vehicle and the one or more objects; determining, based on the object information and the traffic rule information, (1) whether any object currently violates any traffic rule; (2) whether any object will violate any traffic rule when the vehicle passes the object; (3) whether the object would endanger the vehicle passing by the object, and generating a warning instruction if at least one of the determinations is affirmative; and outputting the warning instruction to a HMI of the vehicle to trigger the HMI to warn a human driver of the presence of the object, or to an AD control unit of the vehicle so that the AD control unit executes automatic driving manipulations based on the warning instruction.

The present disclosure provides in yet another aspect a non-transitory computer readable medium with instructions stored therein which, when executed, causes a processor to carry out the steps including: acquiring object information on one or more objects surrounding the vehicle and traffic rule information including one or more traffic rules associated with locations of the vehicle and the one or more objects; determining, based on the object information and the traffic rule information, (1) whether any object currently violates any traffic rule; (2) whether any object will violate any traffic rule when the vehicle passes the object; (3) whether the object would endanger the vehicle passing by, and generating a warning instruction if at least one of the determinations is affirmative; and outputting the warning instruction to a HMI of the vehicle to trigger the HMI to warn a human driver of the presence of the object, or to an AD control unit of the vehicle so that the AD control unit executes automatic driving manipulations based on the warning instruction.

BRIEF DESCRIPTION OF THE DRAWINGS

The disclosed aspects will hereinafter be described in connection with the appended drawings that are provided to illustrate and not to limit the scope of the disclosure.

DETAILED DESCRIPTION

Driving assistance systems found in the prior art are usually configured to push all available object information to a driver, which causes much distraction and confusion to the driver. In view of this, the present disclosure provides an object warning solution for a vehicle, which can filter the obtained object information in combination with traffic rules applicable to the current scene, so as to identify an object that violates traffic rules and/or potentially endangers the vehicle. The object warning solution of the present disclosure also can output a warning instruction to an HMI or an AD control unit of the vehicle to trigger the HMI or the AD control unit appropriately.

An embodiment of the present disclosure includes determining a warning strategy that corresponds to a risk level representing a degree that the object endangers the vehicle. Further, a mode, with which the HMI warns the human driver, is determined based on the risk level. For example, in the case of the risk level being high (e.g., the object is determined as a high-risk object), a strong response is provided in the vehicle; and, in the case of the risk level being low (e.g., the object is determined as a low-risk object), a mild response is provided in the vehicle. In this way, user experience can be improved. Moreover, an embodiment of the present disclosure includes determining an avoidance strategy such that the vehicle can avoid collision with the object according to the avoidance strategy. In this way, driving safety is improved.

In the present disclosure, the term "object" may be understood as traffic participants surrounding the vehicle. Objects may be a person, an item (living or non-living), or a pet. Objects may include stationary objects (e.g., stones or arch bridges) and/or moving objects (e.g., moving vehicles or pedestrians). It is understood that a state of an object may change between a moving state and a static state. For example, an object may be currently stationary and then change to moving, or it may be currently moving and then become stationary.

In the present disclosure, the term "traffic information" may include traffic laws (e.g., general traffic rules), and may also include customized traffic rules for specific scenarios or needs. For example, "traffic rule information" may include traffic rule information on actual roads, such as roadside signs. The information on actual roads, such as the roadside signs, may be obtained by on-board sensors, or may be stored in a roadside facility or a cloud server and then sent to the vehicle when the vehicle arrives near the roadside signs. Embodiments of the present disclosure will be described below with reference to the drawings.

Figure 1:
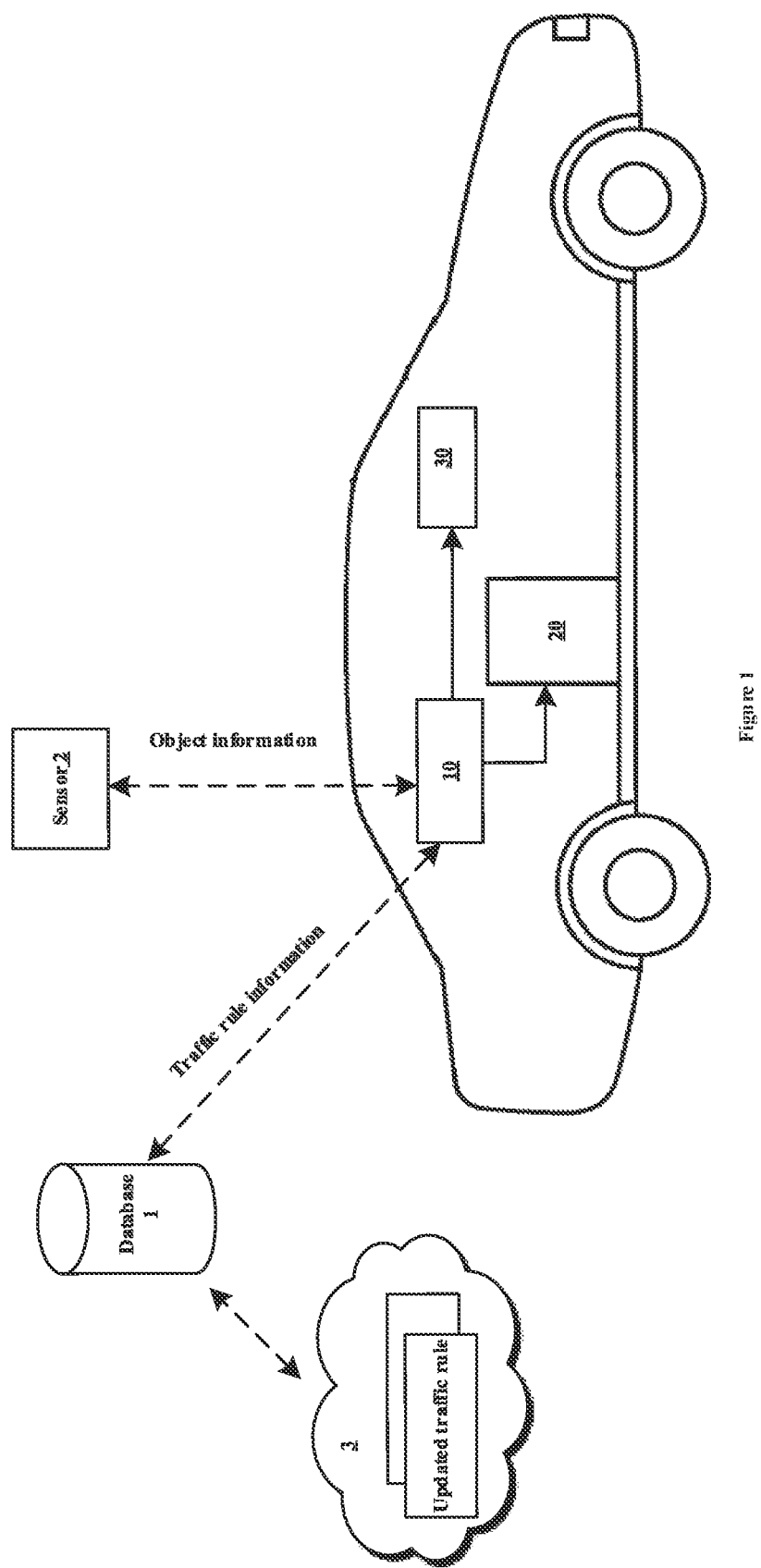
FIG. 1 is an exemplary environment in which some embodiments of the present disclosure may be implemented.
Figure 2:
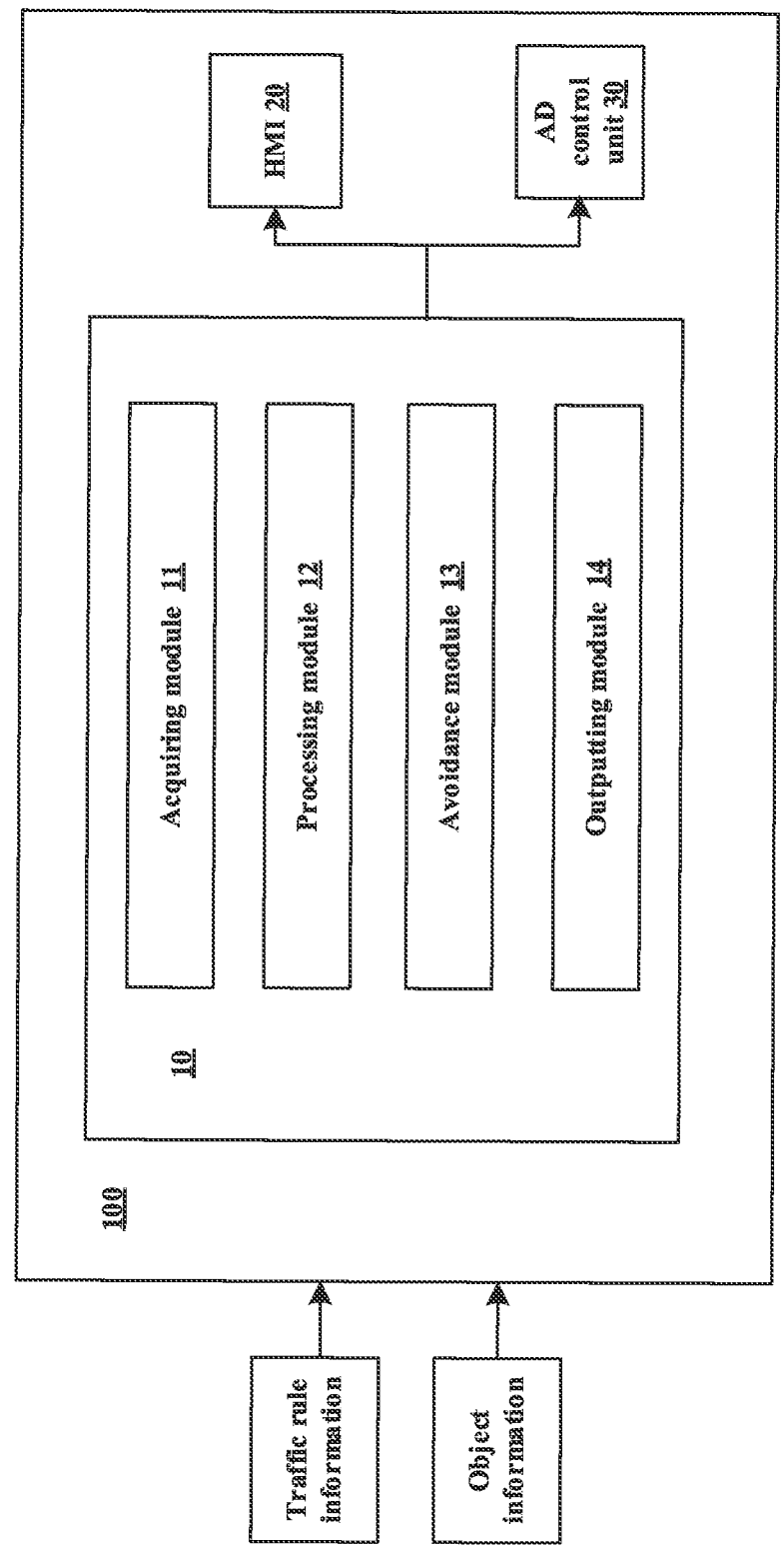
FIG. 2 is a schematic block diagram of an object warning system for a vehicle according to an embodiment of the present disclosure.

FIG. 1 shows an environment in which embodiments of the present disclosure can be implemented. It is noted that the present disclosure is not limited to the specific architecture of FIG. 1. FIG. 2 schematically shows an object warning system 100 for a vehicle according to an embodiment of the present disclosure. The object warning system 100 is disposed on or in the vehicle and includes an object warning apparatus 10, an HMI 20 and an automatic driving (AD) control unit 30.

The object warning apparatus 10 obtains traffic rule information and object information to determine whether the object violates any traffic rule included in the traffic rule information and to determine whether the object potentially endangers the vehicle when passing by the object. The object warning apparatus 10 filters out the object information indicating that an object neither violates any traffic rule nor potentially endangers the vehicle when passing by the object. The object warning apparatus 10 generates a warning instruction in the case of receiving object information indicating an object violates a traffic rule and/or potentially endangers the vehicle when passing by the object. The object warning apparatus 10 outputs a warning instruction to the HMI 20 if the vehicle is driven by a human driver or to the AD control unit 30 if the vehicle is in an automatic driving mode.

The traffic rule information including traffic rules may come from an electronic traffic rule manual which may be processed according to specific traffic scenes. The traffic rule information may include general traffic rule information and special traffic rule information which may be the information about real-time road conditions. The special traffic rule information may be obtained by on-board sensors of the vehicle when they are sensing environment information such as roadside signs.

The electronic traffic rule manual is processed to obtain the traffic rule information. In an example, processing the electronic traffic rule manual may include classifying traffic rules based on scenes (e.g. the traffic rules are classified to associate with the types of road junction, highway and country road), such that traffic rules related to the same scene are stored in one category indicating the scene. In this example, processing the electronic traffic rule manual may further include classifying traffic rules based on object type (e.g., pedestrian or vehicle) to obtain sub-categories based on object type under the categories based on scene. In other words, the electronic traffic rule manual of the present disclosure is classified and rearranged according to scene type or both scene type and object type, which helps the object warning apparatus to search and extract traffic rule information related to a specific scene and/or object. For example, the object warning apparatus extracts one or more traffic rules related to the current scene, which are associated with highway (scene type) and pedestrian (object type).

It is noted the method for processing the electronic traffic rule manual may be adjusted and updated adaptively according to requirements of an actual application so as to obtain traffic rule information suitable for the actual application.

In an example, the object warning apparatus 10 may obtain traffic rule information from a database 1 storing the processed electronic traffic rule manual. The database 1 may be located outside the vehicle (e.g., in a cloud server which is in communication with the vehicle) or inside the vehicle (e.g., in a memory of the vehicle). The processed electronic traffic rule manual may be implemented as a list including accessible interfaces each of which is associated with a scene type or both a scene type and an object type. For example, an interface of the list is associated with one of highway, urban road and country road and/or one of vehicle speed, obstacle size and night driving).

The object information may include elements indicating one or more of state, characteristic, and attribute of an object. For example, the object information includes information on type, position, and speed of an object.

The object warning apparatus 10 may obtain the object information from an object itself. For example, the object is a pedestrian and the pedestrian carries a mobile phone or wearable device, which can collect object information and send the collected information to the object warning apparatus 10. The object warning apparatus 10 may obtain object information via in-vehicle sensors 2 (for example, camera, radar and lidar), and analyze and process the obtained object information. The object warning apparatus 10 may receive object information from a cloud server or a roadside facility via wireless communication (for example, 5G, C-V2X, DSRC).

It is noted that the present disclosure does not limit the method for obtaining the object information. In an example, processing including identifying useful information from the obtained object information and then analyzing the identified information to obtain object parameters required in subsequent calculations, analysis or judgments is performed at an on-board device such as the electronic control unit (ECU or VCU) of the vehicle. In another example, such processing is performed at an off-board device such as a cloud server or an edge server, and then processed results are sent to the vehicle.

The object warning apparatus 10 outputs a warning instruction to the HMI 20 of the vehicle if the vehicle is driven by a human driver. Upon receiving the warning instruction, the HMI 20 warns the human driver of the presence of the object. The warning may be provided in one or more forms, such as visual, audio, voice, and vibration. The HMI 20 may be implemented in one or more of devices of the vehicle and each of the devices can be triggered to warn the driver. For example, the devices include at least one of a steering wheel, a driver's seat, a head-up display, a central control display screen and a voice broadcaster.

The object warning apparatus 10 outputs the warning instruction to the automatic driving control unit 30 of the vehicle if the vehicle is in an automatic driving mode. Upon receiving the warning instruction, the automatic driving control unit 30 executes automatic driving manipulations according to the warning instruction.

The object warning apparatus 10 may include an acquiring module, a processing module, an avoidance module and an outputting module. The object warning apparatus 10 and its modules may be implemented by means of hardware or software or a combination of hardware and software, including a non-transitory computer readable medium stored in a memory and implemented as instructions executed by a processor. Regarding the part implemented by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The part implemented by software may include microcode, program code or code segments. The software may be stored in a machine-readable storage medium, such as a memory.

It is noted that the object warning apparatus 10 and its modules are named functionally (logically) and they can be physically arranged in one or more parts. For example, the modules may be included in the same chip or circuit. The modules may also be provided in different chips or circuits.

In an embodiment, the object warning apparatus 10 may be implemented to include a memory and a processor. The memory contains instructions that, when executed by the processor, cause the processor to execute the object warning strategy/method according to embodiments of the disclosure.

In an embodiment, the object warning apparatus 10 is implemented by software disposed in a domain controller or an ECU of the vehicle.

Figure 3:
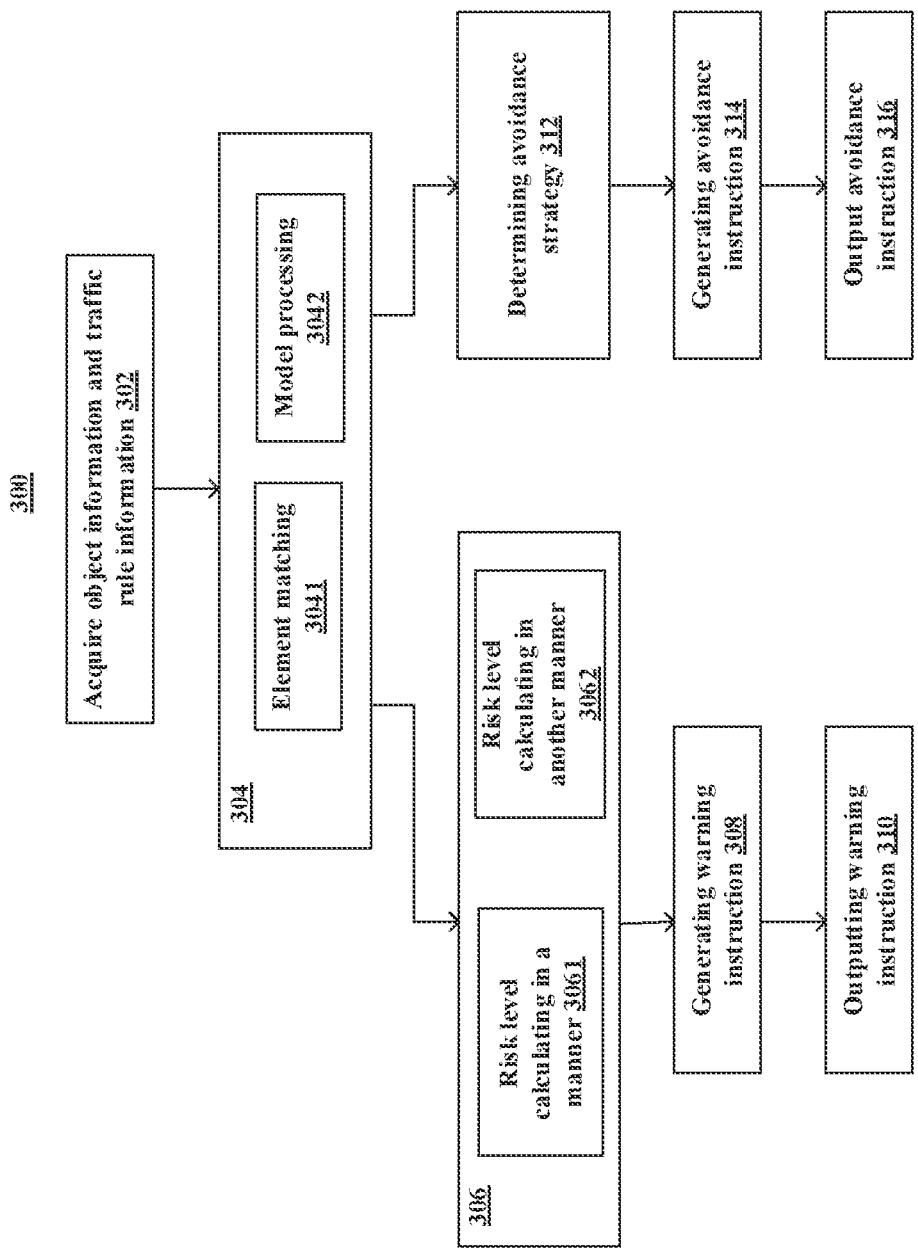
FIG. 3 schematically shows an object warning process according to an embodiment of the present disclosure.

FIG. 3 illustrates an object warning process 300 according to an embodiment of the present disclosure. The process 300 may be executed by the object warning apparatus 10. The working principle of the object warning apparatus 10 is introduced below in combination with FIG. 3.

In block 302, the acquiring module 11 acquires object information and traffic rule information. The object information may include object elements indicating one or more of state, characteristic, and attribute of an object. The traffic rule information may include traffic rules associated with a location of the vehicle and a location of the object. For example, a current traffic scene is determined based on the location of the vehicle and the location of the object, and then traffic rules associated with the determined traffic scene are extracted from an electric traffic rule manual.

The object elements may include: an object being a stationary object or a moving object, type of the object (e.g., plastic bag, paper, stone or pet), the object being a pedestrian passing through an intersection, a size of the object, a size and pattern of pits or bumps on the road, speed of a moving object and a predicted trajectory of the moving object.

The object elements may be the elements that are identified from the object information, or may be the elements that are obtained by means of analyzing and calculating the object information. The analyzing and calculating process may be executed in the vehicle side (for example, in a chip of the vehicle), or in a cloud sever or a roadside device and then analyzed and calculated results are transmitted to the vehicle.

The acquiring module 11 may obtain the object information from one or more of in-vehicle sensor, roadside facility, cloud server and edge server. The acquiring module 11 may also obtain the object information from an object itself if the object includes a wireless communication function.

The traffic rule information may include traffic rules associated with a current traffic scene, which is determined based on a current position of the vehicle and a current position of the object. The current traffic scene may be determined as a highway, a traffic intersection or a fast lane.

The traffic rule elements may include traffic rules specified for obstacles in the current traffic scene. For example, pedestrians are prohibited from appearing on highways, vehicles are prohibited from driving in reverse, pedestrians are prohibited from running red lights, and vehicles on fast roads are restricted to drive within a speed range, etc.

The traffic rule information may come from a database storing an electronic traffic rule manual, which has been processed based on scene types and object types. The database may be arranged inside or outside the vehicle. The traffic rule information stored in the database can be updated. For example, updated traffic rule information is uploaded to a cloud server by traffic participants and periodically downloaded to the database. In this way, the object warning apparatus may obtain the updated traffic rule information from the database.

It is noted that the current position of the vehicle, the current position of the object and the current traffic scene may be obtained by means of a variety of position-acquiring services, such as GPS, HD maps, and the present disclosure does not limit how to determine the positions and scene.

In block 304, the processing module 12 makes determinations regarding the following three aspects based on the acquired information.

First, the processing module 12 determines whether an object currently violates any traffic rule. In an example, determining whether an object currently violates any traffic rule includes: determining whether the object is at a location prohibited in the traffic rules (e.g., whether a parked vehicle violates any traffic rule); determining whether a driving vehicle is over-speeding; determining whether a width or a height of the object exceeds a corresponding threshold; and determining whether a vehicle lamp of a driving vehicle is on when driving during night.

Second, the processing module 12 determines whether the object will violate any traffic rule when the vehicle passes the object. For example, the processing module 12 determines whether the object will violate any traffic rule based on a predicted trajectory of a moving object. In an example, if the object is a surrounding speeding vehicle that is decelerating, the processing module 12 determines whether the surrounding vehicle is still over-speeding when intersecting with the vehicle. If the object is a pedestrian who is running a red light and crossing an intersection, the processing module 12 determines whether the pedestrian will have passed the intersection when the vehicle arrives at the intersection.

Third, the processing module 12 determines whether the object potentially endangers the vehicle. In one embodiment, determining whether the object potentially endangers the vehicle includes: if the object is a protrusion on a road surface, determining whether the height of the protrusion exceeds the height of the chassis of the vehicle; if the object is a pit in a road surface, determining whether the width of the pit exceeds the width of the vehicle wheel; determining whether the object is an object that does not include a collision risk (e.g., paper or plastic bag); determining whether the object is an object which endangers road traffic such as a big rock, a discarded tire, small animals, etc.; and determining whether a driving vehicle is high-speed overtaking.

The processing module 12 may execute the above determinations by means of element matching and/or model processing. Examples of the element matching and model processing will be described below.

In block 3041, the processing module 12 matches object elements with corresponding traffic rule elements and determines each of the above aspects based on the matching result. For example, the processing module 12 matches an object speed (an object element) of a moving object with a speed limit (a corresponding traffic rule element) specified for the current scene. If the speed of the object exceeds the speed limit, the processing module 12 determines that the object violates a traffic rule.

It is noted that the matching between an object element and a corresponding traffic rule element may be repeated for a number of times until a mismatch occurs, then the processing module 12 determines the object violates a traffic rule. If a mismatch could not be found, the processing module 12 determines the object does not violate any traffic rules.

In block 3042, the processing module 12 determines the above three aspects using a model (e.g., an object information filtering model). The model may be preset in the vehicle. The model is, for example, a trained machine learning model. Object elements (e.g., object parameters) of the object information and traffic rule elements (e.g., traffic rule parameters) of the traffic rule information are input into the processing model 12, and the model outputs determining results of the above three aspects after processing the input elements in the model.

It is noted that block 3041 and block 3042 are not mutually exclusive. The processing module 12 may selectively execute block 3041 or 3042 according to an actual application to achieve an optimal processing speed. The processing module 12 may execute both blocks 3041 and 3042 for redundant calculation and judgment to improve reliability and accuracy of the determinations.

In block 306, if at least one of the determining results is affirmative (that is, at least one of the three determining results is "Yes"), the processing module 12 calculates a risk level representing a degree that the object endangers the vehicle. In this way, an appropriate response is generated in the vehicle based on the risk level. Embodiments of block 306 will be described below.

In block 3061, the processing module 12 executes a comprehensive assessment of the risk level and results of the comprehensive assessment may include: (1) a first risk level value a degree that the object endangers the vehicle based on at least one of state, characteristic, and attribute of the object (e.g., the first risk level value may be represented by "high, medium, and low", or may be described in a plurality of grades such as 1~n); (2) a determination result of whether the object currently violates any traffic rule; (3) a determination result of whether the object will violate any traffic rule when the vehicle passes the object.

In an example, the processing module 12 may obtain the risk level using a pre-defined evaluation table. The evaluation table includes a relationship between a risk level and each of various combinations of the above three factors, and thus a risk level corresponding to an actual situation of the object regarding the three factors described in the description of block 3061 can be found from the evaluation table.

In another example, the processing module 12 may obtain the risk level using a pre-defined model (e.g., level calculation model). For example, the first risk value and the determination results as described above are used as input parameters and input into the model, and the risk level is output from the model.

In block 3062, the processing module 12 executes a comprehensive assessment of risk to obtain the risk level and the results of the comprehensive assessment may include: (1) a first risk level value representing the degree to which the object endangers the vehicle based on at least one of state, characteristic, and attribute of the object; (2) a second risk level value based on a violation of any traffic rule at present; (3) a third risk level value based on a violation of any traffic rule when the vehicle passes the object. Each of the first, second and third risk level values may be represented by "high, medium, and low," or may be described in a plurality of grades such as 1~n.

In an example, the processing module 12 may obtain the risk level by means of using a pre-defined evaluation table. The evaluation table includes a relationship between the risk level and each of various combinations of the above three factors, and thus the actual risk level of the object regarding the three factors set forth in the description of block 3062 can be ascertained from the evaluation table.

In another example, the processing module 12 may obtain the risk level of the object using a pre-defined risk level calculation model. For example, the first risk level value, the second risk level value and the third risk level value as described above are used as input parameters and input into the model, and the risk level is output from the model.

In block 308, the processing module 12 generates a warning instruction if at least one of the above determination results is affirmative (i.e., at least one of the above determination results is "Yes").

The warning instruction may include a warning mode to determine the level, frequency and delivery means of the warnings to the driver. The warning mode corresponds to the risk level such that the intensiveness of the warning is enhanced and/or a frequency of the warning is increased as the risk level increases. For example, if the risk level is high, strong voice, strong vibration, and repeated warnings are provided to the human drive. If the risk level is medium, visual and voice warnings will be provided to the human driver with medium volume and medium vibration intensity.

The warning instruction may include an automatic driving strategy corresponding to the risk level if the vehicle is in an automatic driving mode such that the manipulations of the AD control unit correspond to the risk level. For example, if the risk level is high, the AD control unit may determine an emergency stop of the vehicle. If the risk level is medium, the AD control unit may determine to slow down the vehicle.

In block 310, if the vehicle is driven by a human driver, the outputting module 14 outputs the warning instruction to the HMI of the vehicle such that the HMI warns the driver presence of object. If the vehicle is in an AD mode, the outputting module 14 outputs the warning instruction to the automatic driving control unit such that the AD control unit executes AD manipulations according to the warning instruction.

In block 312, if at least one of the determination results is affirmative, the avoidance module 13 determines an avoidance strategy such that the driver or the AD control unit of the vehicle is able to prevent the vehicle from colliding with the object according to the avoidance strategy.

In an example, if the processing module 12 determines a moving object will collide with the vehicle when the vehicle passes the moving object, the avoidance module 13 calculates a vehicle speed and plans a driving path such that the vehicle will not collide with the object.

In block 314, the avoidance module 13 generates an avoidance instruction including an avoidance strategy.

In block 316, the outputting module 14 outputs the warning instruction to the HMI of the vehicle such that the HMI warns the driver presence of the object; or, outputs the warning instruction to the automatic driving control unit such that the AD control unit executes AD manipulations according to the warning instruction.

It is noted that the execution order of block 306 and block 312 is not limited. That is, the order of the calculation of the risk level and the calculation of the avoidance strategy is not fixed. An embodiment of the present disclosure will be described below.

In an embodiment, a vehicle including an object warning apparatus 10 will pass through an intersection (that is, the vehicle is travelling in a scene of a traffic intersection). The object warning apparatus 10 obtains the object information of a pedestrian and the traffic rule information of the intersection. If the object warning apparatus 10 determines that the pedestrian is running a red light and crossing the intersection, or the pedestrian will be crossing the intersection when the vehicle is passing by, the object warning apparatus 10 outputs an object warning to the driver of the vehicle or to the automatic driving control unit of the vehicle. If the object warning apparatus 10 determines the pedestrian has passed the intersection without violating any traffic rule, or the pedestrian will have passed the intersection when the vehicle arrives at the intersection (that is, regardless of whether the pedestrian runs the red light or not, the pedestrian will have already passed the intersection when the vehicle arrives at the intersection), the object warning apparatus 10 does not output the warning instruction, which prevents unnecessary distraction to the driver.

Figure 4:
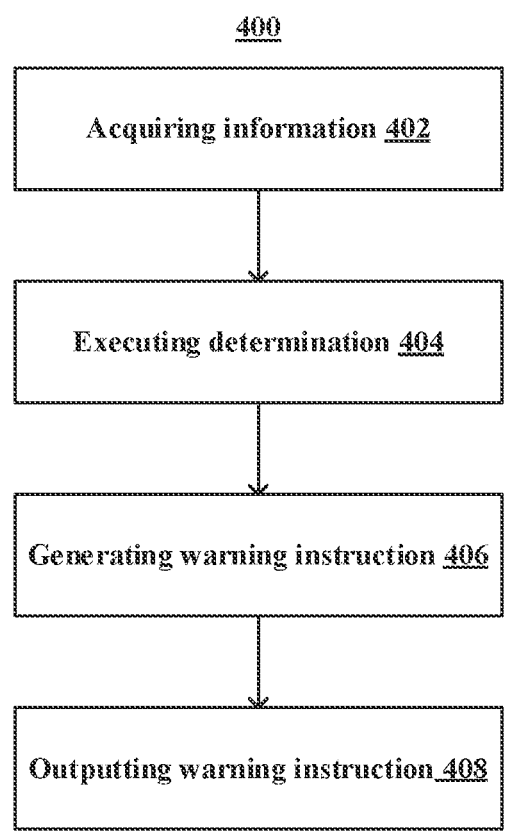
FIG. 4 is a flowchart of an object warning method for a vehicle according to an embodiment of the present disclosure.

FIG. 4 shows an object warning method 400 according to an embodiment of the present disclosure. The method can be performed by means of an object warning apparatus 10 as described above and/or an object warning system 100 as described above. For this reason, various features, which are described above with reference to the apparatus and the system, are also applicable to the method.

Referring to FIG. 4, in step 402, the object information on objects surrounding the vehicle and the traffic rule information including traffic rules associated with locations of the vehicle and the objects are acquired.

In step 404, the following three aspects are determined, based on the object information and the traffic rule information, (1) whether the object currently violates any of the traffic rules; (2) whether the object will violate any of the traffic rules when the vehicle passes the object; (3) whether the object potentially endangers the vehicle passing by.

In step 406, a warning instruction is generated if at least one of the determination results is affirmative.

In step 408, the warning instruction is output to an HMI of the vehicle to trigger the HMI so that the HMI warns a human driver of the presence of the object, or to an AD control unit of the vehicle so that the AD control unit executes automatic driving manipulations based on the warning instruction.

An embodiment of the disclosure may provide a machine or computer readable medium in which software is stored, the software being optionally able to be executed by an object warning apparatus as described above, and the software, when executed, being able to perform an object warning apparatus method as described above.

It should be appreciated that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on a non-transitory computer readable medium. Such non-transitory computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

The invention claimed is:

1. An object warning apparatus for a vehicle, comprising:
   an acquiring module configured to acquire object information on one or more objects surrounding the vehicle and traffic rule information including one or more traffic rules associated with locations of the vehicle and the one or more objects;
   a processing module configured to determine, based on the object information and the traffic rule information, (1) whether any object currently violates any traffic rule; (2) whether any object will violate any traffic rule when the vehicle passes the object; and (3) whether the object would endanger the vehicle passing by the object, and to generate a warning instruction if at least one of aforementioned three determinations is affirmative; and
   an outputting module configured to output the warning instruction to a human-machine interface (HMI) of the vehicle to trigger the HMI to warn a human driver of presence of the object, or to an automatic driving (AD) control unit of the vehicle so that the AD control unit executes automatic driving manipulations based on the warning instruction;
   wherein the processing module is further configured to:
      determine a risk level representing a degree that the object endangers the vehicle based on the determinations;
      if the vehicle is driven by the human driver, determine a warning mode, wherein the warning's intensiveness and frequency is increased when the risk level is increased; and
      if the vehicle is in an automatic driving mode, determine a control strategy of automatic driving based on the risk level such that the automatic driving manipulations correspond to the risk level.

2. The object warning apparatus of claim 1, wherein the processing module is further configured to:
   determine a first risk level value representing the degree to which the object endangers the vehicle based on at least one of state, characteristic, and attribute of the object; and
   determine the risk level based on the first risk value and the determinations of whether the object currently violates any traffic rule and whether the object will violate any traffic rule when the vehicle passes the object.

3. The object warning apparatus of claim 1, wherein the processing module is further configured to:
   determine a first risk level value representing the degree to which the object endangers the vehicle based on at least one of state, characteristic, and attribute of the object;
   determine a second risk level value based on a current violation of any traffic rule;
   determine a third risk level value based on a violation of any traffic rule when the vehicle passes the object; and
   determine the risk level based on the first risk value, the second risk value, and the third risk value.

4. The object warning apparatus of claim 1, wherein the object warning apparatus further comprises an avoidance module, the avoidance module being configured to generate an avoidance strategy if at least one of the determinations is affirmative such that the human driver or the AD control unit of the vehicle performs the avoidance strategy to prevent the vehicle from colliding with the object.

5. The object warning apparatus of claim 1, wherein the object information comprises object elements and the traffic rule information comprises traffic rule elements, and the processing module is configured to match object elements with corresponding traffic rule elements to make the determinations.

6. The object warning apparatus of claim 1, wherein the processing module is configured to generate determinations using an object information filtering model, and optionally, the object information filtering model is a trained machine learning model, and
   wherein the object information comprises object elements and the traffic rule information comprises traffic rule elements, the object elements and the traffic rule elements are input into the object information filtering model, and an output including the determinations is generated from the object information filtering model.

7. A vehicle, comprising:
   an object warning apparatus, comprising:
   an acquiring module configured to acquire object information on one or more objects surrounding the vehicle and traffic rule information including one or more traffic rules associated with locations of the vehicle and the one or more objects;
   a processing module configured to determine, based on the object information and the traffic rule information, (1) whether any object currently violates any traffic rule; (2) whether any object will violate any traffic rule when the vehicle passes the object; and (3) whether the object would endanger the vehicle passing by the object, and to generate a warning instruction if at least one of aforementioned three determinations is affirmative; and
   an outputting module configured to output the warning instruction;
   a human-machine interface (HMI) in communication with the object warning apparatus; and
   an automatic driving (AD) control unit in communication with the vehicle warning apparatus;
   wherein, if the vehicle is in an automatic driving mode, the object warning apparatus is configured to output the warning instruction to the AD control unit such that the AD control unit executes AD manipulations according to the warning instruction;

wherein, if the vehicle is driven by a human driver, the object warning apparatus is configured to output the warning instruction to the HMI to warn the human driver of presence of the object; and wherein the processing module is further configured to:
determine a risk level representing a degree that the object endangers the vehicle based on one or more of the determinations;
if the vehicle is driven by the human driver, determine a warning mode, with which the HMI warns the driver, wherein the warning's intensiveness and frequency is increased when the risk level is increased; and
if the vehicle is in an automatic driving mode, determine a control strategy of automatic driving based on the risk level such that the automatic driving manipulations correspond to the risk level.

8. The vehicle of claim 7, wherein the processing module is further configured to:
determine a first risk level value representing the degree to which the object endangers the vehicle based on at least one of state, characteristic, and attribute of the object; and
determine the risk level based on the first risk value, whether the object currently violates any traffic rule and whether the object will violate any traffic rule when the vehicle passes the object.

9. The vehicle of claim 7, wherein the processing module is further configured to:
determine a first risk level value representing the degree to which the object endangers the vehicle based on at least one of state, characteristic, and attribute of the object;
determine a second risk level value based on a current violation of any traffic rule;
determine a third risk level value based on a violation of any traffic rule when the vehicle passes the object; and
determine the risk level based on the first risk value, the second risk value, and the third risk value.

10. The vehicle of claim 7, wherein the object warning apparatus further comprises an avoidance module, the avoidance module being configured to generate an avoidance strategy if at least one of the determinations is affirmative such that the human driver or the AD control unit of the vehicle performs the avoidance strategy to prevent the vehicle from colliding with the object.

11. The vehicle of claim 7, wherein the object information comprises object elements and the traffic rule information comprises traffic rule elements, and the processing module is configured to match object elements with corresponding traffic rule elements to make the determinations.

12. The vehicle of claim 7, wherein the processing module is configured to generate the determination results using an object information filtering model, and optionally, the object information filtering model is a trained machine learning model, and
wherein object elements included in the object information and traffic rule elements included in the traffic rule information are input into the object information filtering model, and an output including the determinations is generated from the object information filtering model.

13. An object warning method for a vehicle, comprising:
acquiring object information on one or more objects surrounding the vehicle and traffic rule information including one or more traffic rules associated with locations of the vehicle and the one or more objects;
determining, based on the object information and the traffic rule information, (1) whether any object currently violates any traffic rule; (2) whether any object will violate any traffic rule when the vehicle passes the object; and (3) whether the object would endanger the vehicle passing by the object, and to generate a warning instruction if at least one of aforementioned three determinations is affirmative;
outputting the warning instruction to a human-machine interface (HMI) of the vehicle to trigger the HMI to warn a human driver of presence of the object, or to an automatic driving (AD) control unit of the vehicle so that the AD control unit executes automatic driving manipulations based on the warning instructions;
determining a risk level representing a degree that the object endangers the vehicle based on the determinations;
if the vehicle is driven by the human driver, determining a warning mode, wherein the warning's intensiveness and frequency is increased when the risk level is increased; and
if the vehicle is in an automatic driving mode, determining a control strategy of automatic driving based on the risk level such that the automatic driving manipulations correspond to the risk level.

14. A non-transitory computer readable medium with instructions stored therein which, when executed, causes a processor to carry out the steps comprising:
acquiring object information on one or more objects surrounding the vehicle and traffic rule information including one or more traffic rules associated with locations of the vehicle and the one or more objects;
determining, based on the object information and the traffic rule information, (1) whether any object currently violates any traffic rule; (2) whether any object will violate any traffic rule when the vehicle passes the object; and (3) whether the object would endanger the vehicle passing by the object, and to generate a warning instruction if at least one of aforementioned three determinations is affirmative;
outputting the warning instruction to a human-machine interface (HMI) of the vehicle to trigger the HMI to warn a human driver of presence of the object, or to an automatic driving (AD) control unit of the vehicle so that the AD control unit executes automatic driving manipulations based on the warning instructions;
determining a risk level representing a degree that the object endangers the vehicle based on the determinations;
if the vehicle is driven by the human driver, determining a warning mode, wherein the warning's intensiveness and frequency is increased when the risk level is increased; and
if the vehicle is in an automatic driving mode, determining a control strategy of automatic driving based on the risk level such that the automatic driving manipulations correspond to the risk level.

* * * * *